May 26, 1964   S. R. MORRISON   3,134,233
METHOD OF IRRIGATION
Filed Nov. 14, 1960   2 Sheets-Sheet 1
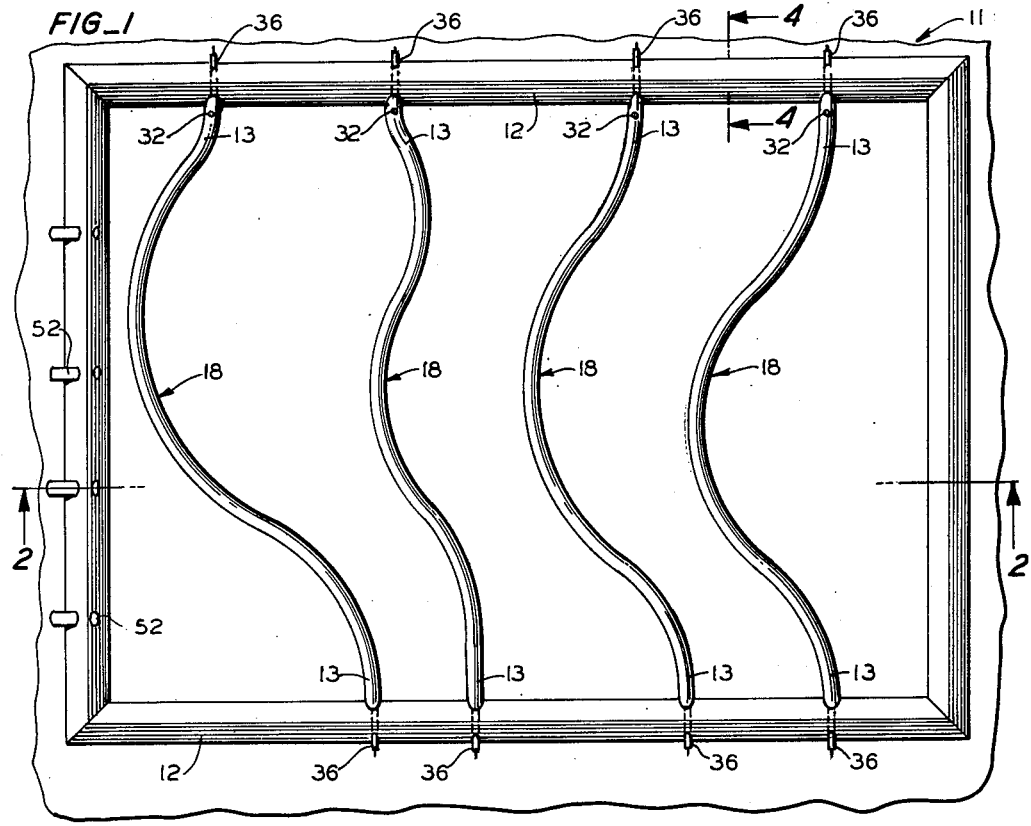
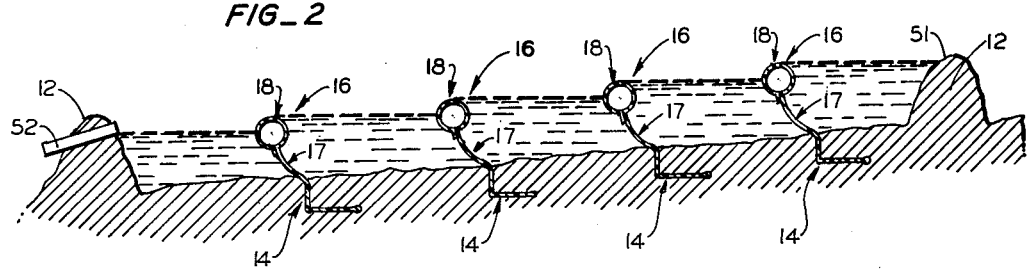
INVENTOR.
STANTON R. MORRISON
BY Lothrop & West
ATTORNEYS May 26, 1964 — S. R. MORRISON — 3,134,233
METHOD OF IRRIGATION
Filed Nov. 14, 1960 — 2 Sheets-Sheet 2
FIG_3
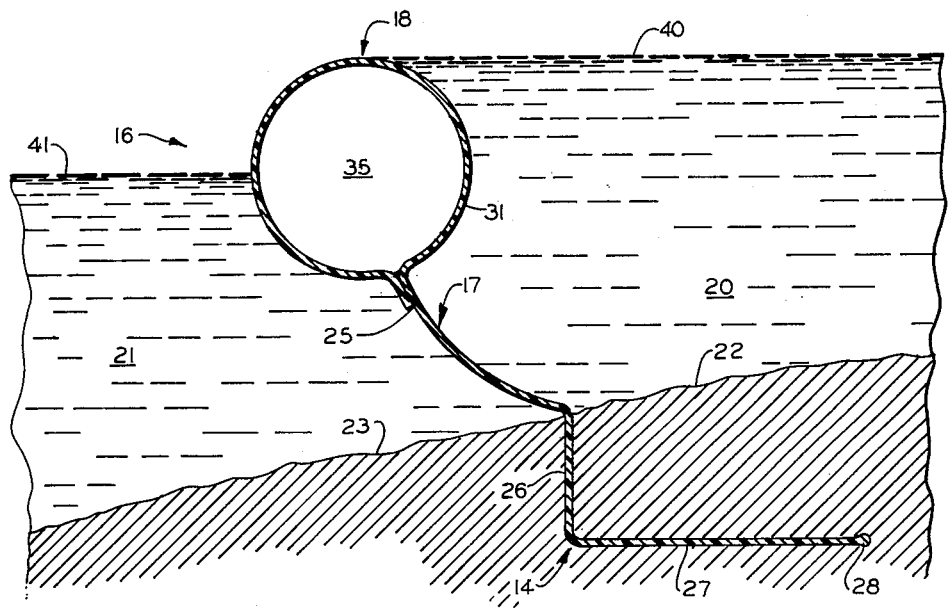
FIG_4
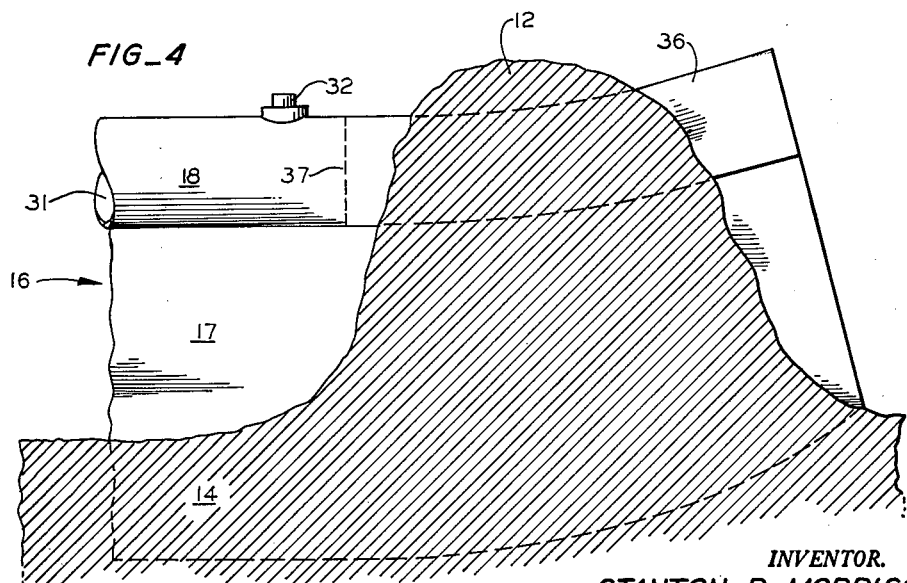
INVENTOR.
STANTON R. MORRISON
BY
ATTORNEYS

United States Patent Office 3,134,233
Patented May 26, 1964

3,134,233
METHOD OF IRRIGATION
Stanton R. Morrison, 805 9th St., Davis, Calif.
Filed Nov. 14, 1960, Ser. No. 68,787
1 Claim. (Cl. 61—12)

The invention relates to an improved method of irrigating land, such as rice fields, and to apparatus for use in conjunction therewith.

Many types of crops, rice being exemplary, utilize a flood type of irrigation. Dirt barriers, or levees, have, under systems heretofore used, been erected along contours disposed at predetermined contour intervals, the land being thereby divided into individual sections or "cuts," as they are known. Water is thereupon introduced into the various cuts in a quantity such as to flood, to a predetermined depth, the land in the cuts. Irrigation of the crop planted in the cuts is thereby effected.

It has been recognized for some time, however, that the use of earthen barriers suffers certain disadvantages. One disadvantage is that the earthen levees occupy a substantial fraction of the total available land area and, since the earth levees are nonproductive, the yield is correspondingly reduced. Furthermore, the earthen barriers, although nonproductive with respect to the crop being grown (rice, for example), they are altogether too effective in producing weeds, and in serving as a source for the spread of weed population to the adjacent fields being cultivated.

It is therefore an object of the invention to provide an irrigation method and apparatus therefor which substantially increases the effective or productive land area in a given field.

It is another object of the invention to provide an irrigation system which substantially reduces the weed population in a given field, as contrasted with the earth levee method of irrigation.

It is yet another object of the invention to provide an irrigation system which can be installed in a relatively economical fashion and which requires but a relatively small upkeep expense.

It is still another object of the invention to provide an irrigation system which is relatively free from the washouts and storm damage often suffered by earthen levees.

It is a further object of the invention to provide an irrigation system which is comparatively easy to remove so as to restore the field to its original condition.

It is another object of the invention to provide a generally improved irrigation system and apparatus therefor.

Other objects, together with the foregoing, are attained in the method and apparatus described in the following description and shown in the accompanying drawings, in which:

FIGURE 1 is a plan view of a field having therein a plurality of "cuts" formed in accordance with the system of the invention;

FIGURE 2 is a cross section, the plane of the section being indicated by the line 2—2 in FIGURE 1, and with water disposed in the cuts;

FIGURE 3 is a cross section, to an enlarged scale, of one of the buoyant impermeable members shown in FIGURE 2; and FIGURE 4 is a section, to an enlarged scale, the plane of the section being indicated by the line 4—4 in FIGURE 1.

While the system and apparatus of the invention are susceptible of numerous embodiments, depending on the environment and requirements of use, considerable numbers of tests of the system and the apparatus have been made and have yielded very satisfactory results.

Although not restricted thereto, the use of the system will herein be referred to in connection with the irrigation of rice.

With especial reference to FIGURE 1, a large field, generally designated by the numeral 11, is circumscribed by an earthen levee 12. The rectangular outline of the levee shown in FIGURE 1 is considerably stylized or idealized and, in the usual field condition, might be at some variance from that indicated. Furthermore, although not shown but in a manner long practiced in the irrigation art, at least one of the sides of the field would be adjacent a canal, or ditch, or other water supply and drainage facility.

The various slopes, gradients and contours of the field 11 are determined, under well-known surveying practices, and, depending upon these known values and the depth of flooding desired, a plurality of contour lines 13 are marked out on the field, each line being ordinarily at a predetermined contour interval with respect to the adjacent lines. The interval in the case of rice is from 0.2 to 0.4 feet.

Thereafter, a ditch plowing device is moved along each of the contour lines 13, forming a ditch, or lifting temporarily a section of the ground, to permit the insertion therein of the tail 14 of a barrier member, generally designated by the numeral 16. After insertion of the tail 14 in the ditch, or in the temporarily lifted section of ground, either the ditch is back-filled or the temporarily elevated ground is allowed to spill or fall back on the tail. In either event, some degree of tamping or compaction of the ground adjacent the tail is preferable, and, in either manner of anchoring the tail, the resultant arrangement will resemble that shown most clearly in FIGURE 3.

The barrier 16 preferably comprises a flexible, substantially continuous, elongated, water-impermeable membrane including not only the anchor or tail portion 14, but also a dividing wall or membrane portion 17 extending upwardly from the tail and terminating in a buoyant or float member 18.

Conveniently, the barrier 16 can be fabricated from an elongated sheet or strip of a plastic material, such as polyethylene, of a suitable variety and thickness, such as six to ten mils.

As appears most clearly in FIGURES 2 and 3, the tail 14 serves not only as an anchor member, resisting the upward and lateral forces exerted by the water 20 and 21 (see FIGURE 3) on the buoyant member 18 and the membrane 17, but the tail 14 also acts as a below-ground barrier capable of preventing ground flow or seepage of water from a one cut to an adjacent cut at a lower, e.g. from the cut 22 to the cut 23 (see FIGURE 3).

The tail 14 is therefore preferably elongated and includes not only a vertical or upright portion 26, but also a horizontal portion 27. In order to increase the frictional effort exerted by the tail 14, the distal edge of the horizontal portion 27 is provided with a bead 28. The bead 28 is also useful in strengthening the edge along which it is located and, in the event that automatic equipment (not shown) is used to anchor the tail 14, the stiffening provided by the bead 28 is found to be a useful attribute. Under certain ground conditions, still further anchoring friction might be desirable. In this event, some corrugation of the portions 26 and 27 can be resorted to, although this variation is not shown in the drawings.

With respect to the buoyant member 18, it is to be realized that a considerable variety of "floats" could be affixed to the upper edge of the dividing membrane or wall 17. However, an air-filled sleeve 31 formed of the same material as the membrane 17 and the tail 14 has been found to serve in an eminently successful fashion. A suitable valve 32 of any of the kinds widely used in inflating plastic items can be employed. Suitable adhesive 25 serves to join the lapped portions together, forming the interior hollow chamber 35.

As is indicated most clearly in FIGURES 1 and 4, the sleeve 31 is pinched and sealed together adjacent its opposite ends 36, commencing at the approximate location indicated by the numeral 37 shown in FIGURE 4. The ends of the barrier extend through the earthen levees 12 located as shown in FIGURE 1 and are anchored therein as by friction.

As previously explained, the several barriers 16 are disposed along the various predetermined contours in the manner shown and described. The various dimensions of the barrier's components are ascertained from experience. It is clear that the slant height of the dividing membrane 17 and the diameter of the sleeve 31 (see FIGURE 3) will be selected so as to provide the desired difference in height between the water level 40 in the cut 22 and the water level 41 in the cut 23. The dimensions and placement of the tail portion 14, on the other hand, will depend upon the nature of the ground and, more particularly, its wet coefficient of friction and permeability.

After the barriers are installed, the irrigation water can be introduced into the cuts. It is obvious that before any water is introduced, the float member 18 and the membrane 17 will be resting on the ground except for a short length adjacent each end 36, where the barrier is held substantially upright. However, as the water level rises in the respective cuts, the buoyancy of the floats 18 causes the floats 18 and the membranes 17 to rise. Owing to the stepped nature of the barriers 16, the continued introduction of water into the cuts eventually results in a cascade arrangement, as is shown most clearly in FIGURE 2. At the juncture appearing in FIGURE 2, the water level in the farthest right-hand cut is at the maximum desired level, as are the levels in the lower cuts. Each of the barriers assumes the attitude substantially indicated by FIGURES 2 and 3; and, since the dimensions of each of the barriers are substantially identical and since they are located at substantially identical contour intervals, the difference in the water level between adjacent cuts is likewise almost identical. This result is much to be desired since it affords equal treatment to the crops growing in all of the cuts.

It should also be noted that the system is self-regulating in that the respective water levels are maintained even though rainfall were to add several inches. The proportions of the farthest right-hand one of the barriers 16 (see FIGURE 2) are such that the top of the buoyant member 18 is at all times below the top 51 of the right-hand levee 12. The result is that excess rainwater spills over the right-hand float 18 into the next lower cut. Surplus from this cut spills into the next lower cut, and so on. Eventually, the total surplus reaches the left-hand cut and builds up the water level in this cut. To handle the overflow, a water level control element, such as a plurality of drainage members 52, is afforded.

What is claimed is:

An irrigation system comprising the steps of:
(a) delineating on an enclosed field to be flood-irrigated a plurality of contours at predetermined contour intervals;
(b) burying along each of said plurality of contours the lower edge of an elongated flexible membrane having a lower edge and a buoyant upper edge;
(c) introducing above the uppermost one of said contours an amount of water sufficient to move successively over all of said buoyant upper edges of said membranes and to reach below the lowermost of said contours; and
(d) continuing to introduce water until all of said buoyant upper edges of said membranes are bounded by water and are lifted upwardly thereby to buoyant position.

References Cited in the file of this patent

UNITED STATES PATENTS

| | | |
|---|---|---|
| 1,215,057 | Perkins | Feb. 6, 1917 |
| 1,381,427 | Patrick | June 14, 1921 |
| 2,157,671 | Payne | May 9, 1939 |
| 2,185,458 | Giliasso | Jan. 2, 1940 |
| 2,609,666 | Mesnager | Sept. 9, 1952 |

FOREIGN PATENTS

| | | |
|---|---|---|
| 33,367 | Norway | Oct. 17, 1921 |